(No Model.)
J. U. HUBBARD.
DEVICE FOR MAKING CLAW HATCHETS.
No. 339,059.
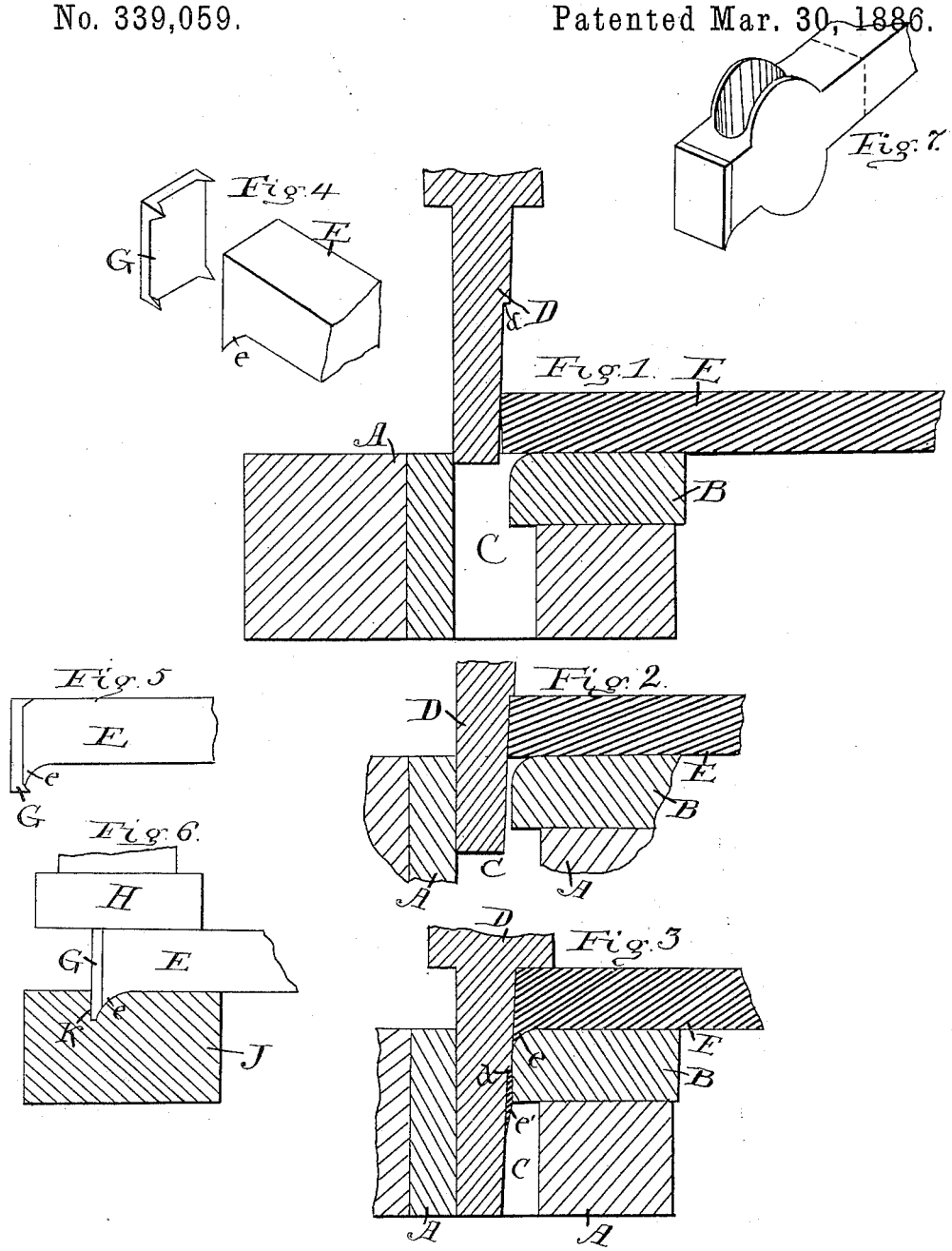
Witnesses:
E. J. Clark
G. Mitchell
Inventor:
John U. Hubbard
by S. N. Bates his atty.

UNITED STATES PATENT OFFICE.

JOHN U. HUBBARD, OF OAKLAND, MAINE.

DEVICE FOR MAKING CLAW-HATCHETS.

SPECIFICATION forming part of Letters Patent No. 339,059, dated March 30, 1886.

Application filed December 29, 1885. Serial No. 187,037. (No model.)

*To all whom it may concern:*

Be it known that I, JOHN U. HUBBARD, a citizen of the United States, residing at Oakland, in the county of Kennebec and State of Maine, have invented certain new and useful Improvements in Making Claw-Hatchets; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to the manufacture of claw-hatchets, or those having a nail-removing device connected with the head, and it applies to that method of manufacture where the iron poll is cut from the end of a solid bar, the eye being punched and plated out and a steel head and steel blade welded on, as distinguished from that method where a flat piece of iron is doubled on its middle around a mandrel which forms the eye of the hatchet.

My invention consists of methods and machinery by which the hand-labor previously employed to form the claw is replaced by machinery, as will be hereinafter shown.

Hitherto the claw part of the hatchet in the method of manufacture to which my invention relates has been formed thus, viz: The hatchet, having been completely formed in other respects, has a square-faced iron head. This head is heated and taken to an anvil, where the claw projection is drawn out and formed by hand. It is then heated to a welding heat, and the end of a flat steel bar, which is heated at the same time, is welded on and the end cut from the bar with a cold-chisel. This operation requires two heats to be taken, and is done entirely by hand.

In my improved process I draw down the end of the iron bar by the use of dies run by machinery, and after welding thereto a steel clip previously formed of the exact size by machinery, I complete the formation of the claw by another set of dies. I thus form the claw the first thing instead of the last, as in the old process.

I illustrate my invention by the use of the accompanying drawings, in which Figures 1, 2, and 3 represent sections through my first set of dies, with the plunger in different positions as it descends. Fig. 4 represents the bar of iron and the steel clip before welding on. Fig. 5 is the same as Fig. 4 after the clip has been welded. Fig. 6 is a section through die on which the claw is finally shaped. Fig. 7 is a perspective view of the poll when ready to cut from the bar, the dotted lines showing where it is cut off.

A is the bed-block of my first set of dies.

C is the opening into which the plunger D descends, and B is a die having its inner face rounded at the top.

E is the bar of iron on the end of which the poll is to be formed.

D is a plunger attached to the descending arm of the press. The plunger D is slightly tapering, and has at $d$ a small offset, above which the plunger is exactly the size to fit the space between the face of the rounded die B and the opposite side of the opening C. As the plunger D descends, the end of the bar E is placed against its face, and as the plunger goes down the offset $d$ catches the end of the bar, shearing it downward and pressing a portion of the material into the space formed between the rounded end of the die B and the face of the plunger D. (See Fig. 3.) A small slice of iron, $e'$, is sheared entirely off each time. A projection, $e$, which, when split, becomes the claw of the hatchet, is thus formed on the under edge of the bar E, as shown in Fig. 4. The end of the bar thus formed forms the face of the hatchet-head when the same is completed. The steel clip G, having a spur at each corner, is now stuck on the end of the bar E, covering the whole face, including the projection $e$. The end of the bar bearing the clip, as in Fig. 5, is now placed in the fire and heated to a welding heat, after which they are welded by simply striking the end of the bar against an anvil. The bar E is then placed with its projecting edge downward on the block J, having in it the groove K, of the form required for the claw projection. The die H comes down on the bar E, pressing the projection $e$ into the groove K, and thus forming the claw projection of the exact form required. This groove is of the general shape of a right-angle triangle, its hypotenuse being slightly curved, so as to give the claw the proper shape. Having thus faced the head of the hatchet with steel and formed the claw projection e, the usual method of completing the hatchet is proceeded with— that is, the eye is punched and plated out, as shown in Fig. 7, and the poll is then cut from the bar at the point indicated by the dotted lines in Fig. 7.

The successive operations which I have described are all done with one heating in the following order, viz: The clip being stuck on the end of the bar, as I have described, is then heated to a welding heat, the welding effected by striking the bar endwise on an anvil. It is then placed under die H and the projection formed, the eye is punched and plated out, the poll cut off, and the end of the bar which forms the head of the next hatchet is placed under plunger D and the projection e drawn out. The heat given to the iron to weld on the steel clip is sufficient for these operations, which are done with great rapidity.

I have previously shown that two heats and considerable hand-labor were required to draw out the claw and weld on the steel head, while by my process I use but one heat for the whole formation of the poll.

I claim—

1. In the manufacture of claw-hatchets, the method of making the steel-faced claw-head by forming on the end of a bar of iron a projecting edge, substantially as shown, and then welding thereto a flat steel clip, and afterward shaping the claw projection by pressing it into a grooved die constructed for the purpose, substantially as described.

2. In a device or machine for making claw-hatchets, the combination of the plunger D, having an offset, d, for shearing the end of the bar and pressing a part of the material between the end of the die B and the face of the plunger, with the bed-piece A and the die B, having a curved face, substantially as and for the purposes described.

In testimony whereof I affix my signature in presence of two witnesses.

JOHN U. HUBBARD.

Witnesses:
   S. W. BATES,
   A. R. SMALL.